US011541698B2

(12) United States Patent
Jung et al.

(10) Patent No.: US 11,541,698 B2
(45) Date of Patent: Jan. 3, 2023

(54) HELMHOLTZ RESONATOR FOR VEHICLE WHEEL

(71) Applicants: HYUNDAI MOTOR COMPANY, Seoul (KR); KIA MOTORS CORPORATION, Seoul (KR)

(72) Inventors: Jae Sung Jung, Hwaseong-si (KR); Young Seok Jang, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 797 days.

(21) Appl. No.: 16/454,999

(22) Filed: Jun. 27, 2019

(65) Prior Publication Data
US 2020/0282778 A1 Sep. 10, 2020

(30) Foreign Application Priority Data
Mar. 5, 2019 (KR) .......................... 10-2019-0025062

(51) Int. Cl.
*B60B 21/12* (2006.01)
*B60C 19/00* (2006.01)
*B60B 21/02* (2006.01)

(52) U.S. Cl.
CPC ............ *B60C 19/002* (2013.01); *B60B 21/02* (2013.01); *B60B 21/12* (2013.01)

(58) Field of Classification Search
CPC ........ B60C 19/002; B60B 21/02; B60B 21/12
See application file for complete search history.

(56) References Cited

U.S. PATENT DOCUMENTS

| 6,145,937 | A | * | 11/2000 | Chen | ..................... B60B 21/062 301/58 |
| 2015/0047920 | A1 | * | 2/2015 | Zhu | ....................... B60C 19/002 29/894.31 |
| 2017/0108074 | A1 | | 4/2017 | Lim | |
| 2019/0366764 | A1 | * | 12/2019 | Nagatomi | ............. B60C 19/002 |

FOREIGN PATENT DOCUMENTS

| JP | 2004-306659 A | 11/2004 |
| JP | 2007-326533 A | 12/2007 |
| JP | 6126673 B2 | 5/2017 |
| KR | 10-2017-0116321 A | 10/2017 |
| KR | 10-2018-0045602 A | 5/2018 |
| KR | 10-1893350 B1 | 8/2018 |
| WO | 2016/139317 A1 | 9/2016 |

OTHER PUBLICATIONS

German Office Action dated Oct. 6, 2021, issued in corresponding German Patent Application No. 102019121326.6 with English Translation.

* cited by examiner

*Primary Examiner* — Scott A Browne
(74) *Attorney, Agent, or Firm* — Morgan, Lewis & Bockius LLP

(57) ABSTRACT

A Helmholtz resonator for a vehicle wheel reduces sonic resonance, which is generated in a tire during running of the vehicle, by employing a wheel cap, which has an internal chamber in the vehicle wheel cap and is closely mounted on the vehicle wheel from the outside of the vehicle wheel, a connecting pipe connecting the internal chamber in the vehicle wheel cap with the cavity in the tire and a coupling member.

6 Claims, 3 Drawing Sheets

HELMHOLTZ RESONATOR FOR VEHICLE WHEEL

CROSS-REFERENCE TO RELATED APPLICATION

The present application claims priority to Korean Patent Application No. 10-2019-0025062, filed on Mar. 5, 2019, the entire contents of which is incorporated herein for all purposes by this reference.

BACKGROUND OF THE INVENTION

Field of the Invention

The present invention relates to a Helmholtz resonator for a vehicle wheel, and more particularly to a Helmholtz resonator for a vehicle wheel capable of absorbing sonic resonance, which is generated from tires during running of the vehicle, by employing a wheel cap, which is mounted on an external surface of the vehicle wheel and has therein an internal chamber.

Description of Related Art

In general, when a vehicle runs, a side wall of a tire vibrates through vibration of the tire due to a road surface. Owing to the vibration of the side wall, resonance is generated in the internal space of the tire, and sonic resonance in a frequency range of 200 Hz to 300 Hz is generated due to the resonance.

The sonic resonance, which has been generated in the present way, is transmitted to the vehicle body via the chassis system of the vehicle, and is finally transmitted to a passenger in the vehicle internal, provided as an element that deteriorates ride quality.

As structures for reducing sonic resonance transmitted to a vehicle internal, there are a structure in which a resonant tube, which is separately prepared, is mounted on a rim forming a wheel and a structure in which a resonant tube is formed in a cross section of a wheel through wheel stir welding.

However, because the structure in which a resonant tube, which is separately prepared, is mounted on a rim portion of a wheel requires a special coupling process such as welding to couple the resonant tube, there are disadvantages of increased working man-hours and increased manufacturing costs. Meanwhile, the structure in which a resonant tube is formed in a cross section of a wheel through wheel stir welding has a disadvantage of an excessive increase in manufacturing costs due to the vehicle wheel stir welding.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a Helmholtz resonator for a vehicle wheel, which is configured to absorb sonic resonance by employing a wheel cap having an internal chamber and mounted on an external surface of a wheel and which is configured to facilitate mounting thereof and specifically to greatly reduce costs associated with mounting.

In accordance with various aspects of the present invention, the above and other objects may be accomplished by the provision of a Helmholtz resonator for a vehicle wheel including a wheel cap, closely mounted on the vehicle wheel from an outside of the vehicle wheel and having an internal chamber in the vehicle wheel cap, and a connecting pipe extending through the vehicle wheel, the connecting pipe being connected at a first end portion thereof to the internal chamber in the vehicle wheel cap and at the other end portion thereof to a cavity defined between the vehicle wheel and a tire configured to be coupled to the vehicle wheel.

The Helmholtz resonator for a vehicle wheel may further include a coupling member coupled to the other end portion of the connecting pipe, which is protrudingly formed into the cavity, to prevent the vehicle wheel cap from being separated from the vehicle wheel.

The other end portion of the connecting pipe, which is protrudingly formed into the cavity, may be mounted on an external peripheral surface thereof with a threaded portion, and the coupling member may be a nut which is engaged with the threaded portion of the connecting pipe to maintain airtightness between the coupling member and the connecting pipe.

The vehicle wheel cap may be closely mounted on a spoke forming the vehicle wheel from an outside of the vehicle wheel.

A fitting hole may be formed through a portion of the vehicle wheel at which a spoke and a rim portion of the vehicle wheel are connected to each other, the one end portion of the connecting pipe may be integrally coupled to the vehicle wheel cap, and the other end portion of the connecting pipe may be exposed to the cavity through the fitting hole when the vehicle wheel cap is closely mounted on the vehicle wheel from an outside of the vehicle wheel.

When the coupling member is engaged with the threaded portion of the connecting pipe, the coupling member may be brought into close contact with a rim portion of the vehicle wheel and may be held in position.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
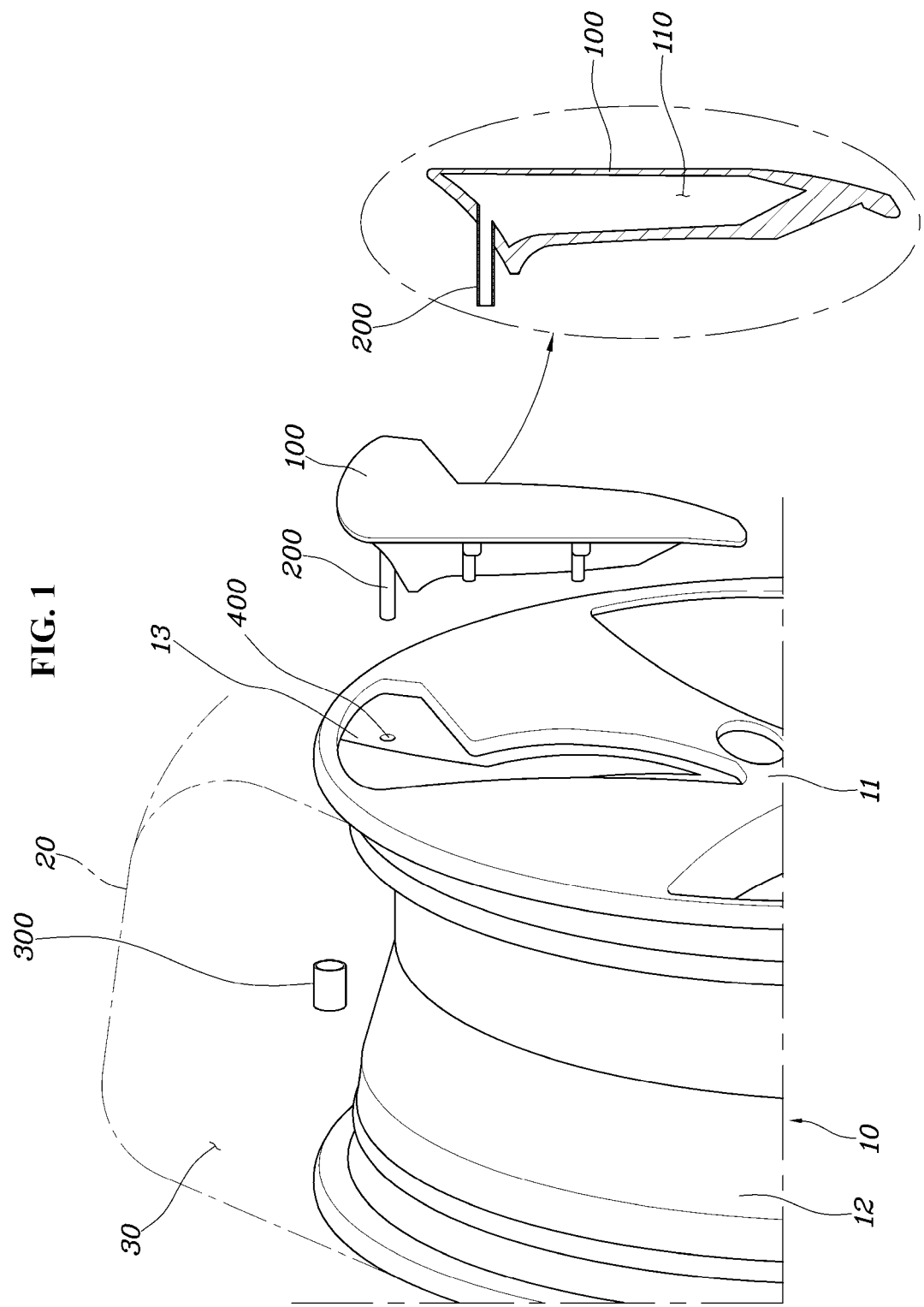
FIG. 1 is an exploded perspective view of a Helmholtz resonator according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Reference will now be made in detail to a Helmholtz resonator for the vehicle wheel according to an exemplary embodiment of the present invention, an example of which is illustrated in the accompanying drawings.

Figure 2:
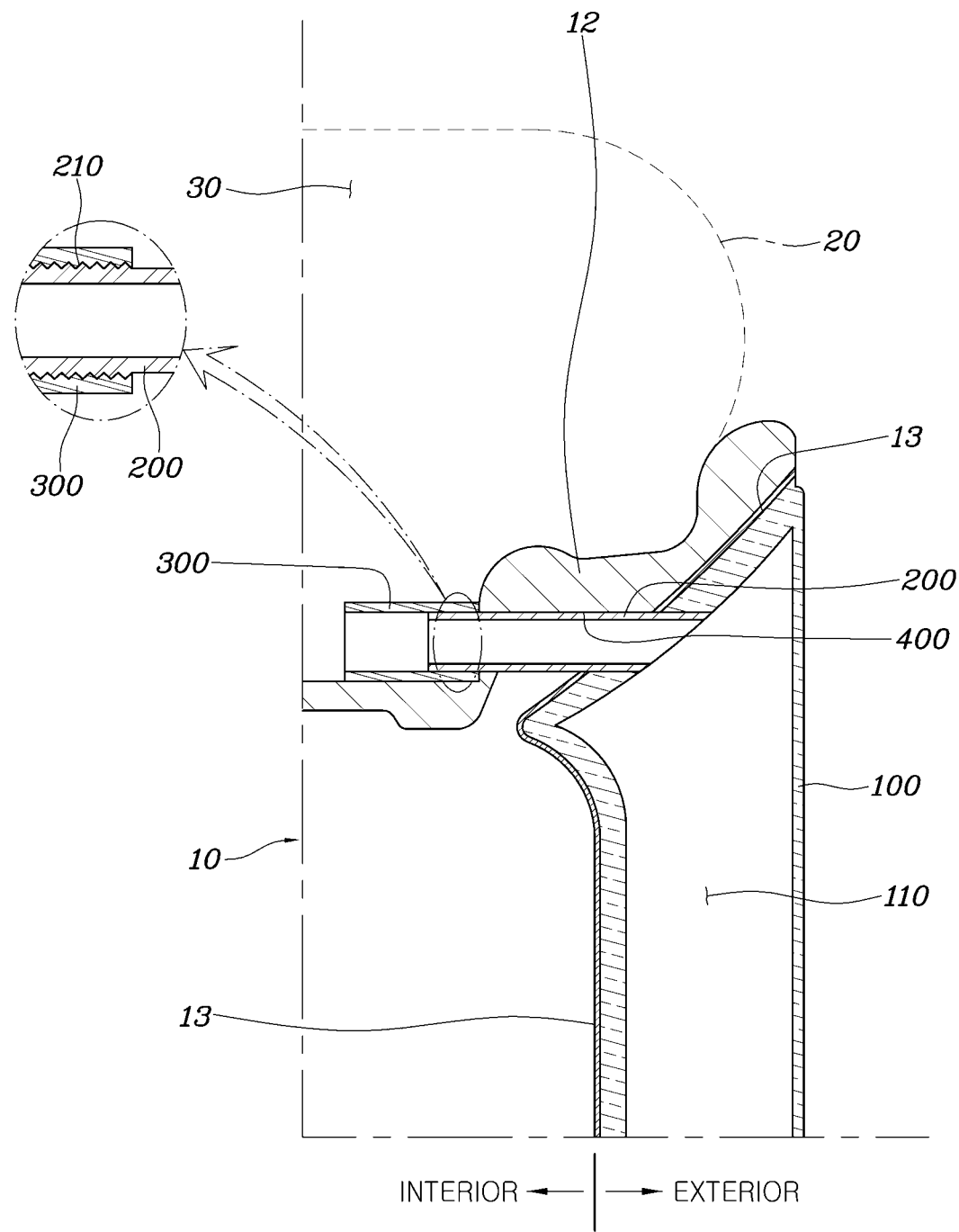
FIG. 2 is a cross-sectional view exemplarily illustrating the Helmholtz resonator shown in FIG. 1, which is mounted.
Figure 3:
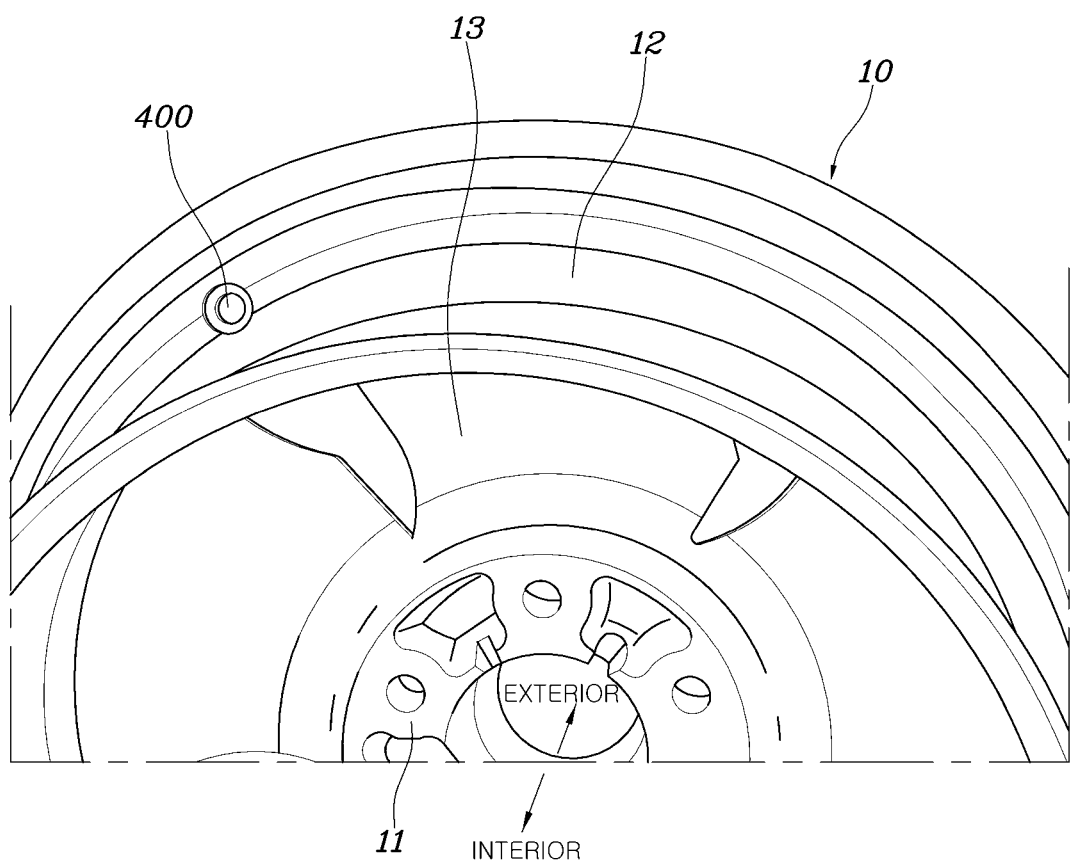
FIG. 3 is a perspective view of a wheel in which a fitting hole is formed for mounting of the Helmholtz resonator.

As illustrated in FIG. 1, FIG. 2, and FIG. 3, the Helmholtz resonator for the vehicle wheel according to the exemplary embodiment of the present invention includes a wheel cap 100, which is closely mounted onto a wheel 10 from the outside thereof (external) and has an internal chamber 110 having a predetermined size, a connecting pipe 200 extending through the vehicle wheel 10, which is connected at a first end portion thereof to the internal chamber 110 in the vehicle wheel cap 100 and at the other end portion thereof to a cavity 30 defined between the vehicle wheel 10 and a tire 20, and a coupling member 300 coupled to the other end portion of the connecting pipe 200 projecting into the cavity 30 to prevent separation of the vehicle wheel cap 100 from the vehicle wheel.

The aluminum vehicle wheel 10, which is a component to which the tire 20 is coupled, includes a central hub 11, a rim 12 defining the external peripheral portion of the vehicle wheel 20, and a plurality of spokes 13 connecting the rim 12 to the hub 12. The tire 20 is coupled onto the rim 12, generating the cavity 30 having a predetermined volume between the rim 12 of the vehicle wheel 10 and the tire 20.

Accordingly, the exemplary embodiment of the present invention is configured to reduce sonic resonance generated in the tire 20 during running of the vehicle by employing the vehicle wheel cap 100 having the internal chamber 110, the connecting pipe 200 connecting the internal chamber 110 in the vehicle wheel cap 100 with the cavity 30 in the tire 20, and the coupling member 300.

According to the exemplary embodiment of the present invention, the other end portion of the connecting pipe 200, which is protrudingly formed into the cavity 30, is provided on the external peripheral surface thereof with a threaded portion 210, and the coupling member 300 is embodied as a nut which is engaged with the threaded portion 210 of the connecting pipe 200 to maintain airtightness between the coupling member 300 and the connecting pipe 200.

Accordingly, when the coupling member 300, which is embodied as a nut, is engaged with the threaded portion 210 of the connecting pipe 200, the vehicle wheel cap 100 having the internal chamber 110 is closely coupled to the external surface of the vehicle wheel 10. Consequently, since there is no necessity to provide an additional process of mounting the vehicle wheel cap 100 to the vehicle wheel 10, there are advantages of facilitating mounting of the vehicle wheel cap 100 and of greatly decreasing costs associated with mounting of the vehicle wheel cap 100.

Airtightness may be maintained between the coupling member 300, which is embodied as a nut, and the connecting pipe 200. The airtightness offers an advantage of more efficiently reducing sonic resonance.

The vehicle wheel cap 100, which is closely mounted on the vehicle wheel 10 from the outside, may be closely mounted on the spokes 13 forming the vehicle wheel 10. The vehicle wheel cap 100 may be mounted to be positioned in the space between adjacent spokes 13. Therefore, it is possible to prevent the transverse width of the vehicle wheel 10 from being overly increased due to the vehicle wheel cap 100.

According to various aspects of the present invention, a fitting hole 400 is formed through the connected portion of the vehicle wheel 10 at which the spoke 13 and the rim 12 of the vehicle wheel 10 are connected to each other (at which the external peripheral portion of the spoke and the external end portion of the rim are connected to each other). The one end portion of the connecting pipe 200 is integrally coupled to the vehicle wheel cap 100 through a process such as welding. When the vehicle wheel cap 100 is closely coupled to the vehicle wheel 10 from the outside, the other end portion of the connecting pipe 200 is inserted into the cavity 30 through the fitting hole 400 to be exposed to the internal of the cavity 30. Subsequently, the coupling member 300, including a nut, is threadedly engaged with the other end portion of the connecting pipe 200, with the result that the vehicle wheel cap 100 is closely mounted on the vehicle wheel 10 from the outside.

As the coupling member 300 including a nut is threadedly engaged with the threaded portion 210 of the connecting pipe 200, the coupling member is closely fastened to the rim 12 forming the vehicle wheel 10 and is secured thereto. Consequently, the coupling member 300 is configured to be maintained in the securely coupled state.

The vehicle wheel cap 100 and the connecting pipe 200 according to the exemplary embodiment of the present invention may be made of various materials such as aluminum, plastic or the like. The connecting pipe 200 may also include a single connecting pipe or two or more connecting pipes.

As is apparent from the above description, the exemplary embodiment of the present invention has an advantage of being configured for reducing sonic resonance generated in the tire 20 during running of the vehicle by employing the vehicle wheel cap 100 having the internal chamber 110, the connecting pipe 200 connecting the internal chamber 110 in the vehicle wheel cap 100 with the cavity 30 in the tire 20, and the coupling member 300.

Furthermore, the exemplary embodiment of the present invention is constructed such that, when the coupling member 300, which is embodied as a nut, is threadedly engaged with the end portion of the connecting pipe 200, which is protrudingly formed into the cavity 30, the vehicle wheel cap 100 having the internal chamber 110 is closely coupled to the external surface of the vehicle wheel 10. Consequently, since there is no necessity to provide an additional process of mounting the vehicle wheel cap 100 to the vehicle wheel 10, there are advantages of facilitating mounting of the vehicle wheel cap 100 and of greatly decreasing costs associated with mounting of the vehicle wheel cap 100.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A Helmholtz resonator apparatus for a vehicle wheel, the Helmholtz resonator apparatus comprising:
   a vehicle wheel cap mounted on the vehicle wheel from an outside of the vehicle wheel and having an internal chamber in the vehicle wheel cap; and
   a connecting pipe extending through the vehicle wheel, a first end portion of the connecting pipe being connected to the internal chamber in the vehicle wheel cap and a second end portion of the connecting pipe being connected to a cavity defined between the vehicle wheel and a tire configured to be coupled to the vehicle wheel,
   wherein a fitting hole is formed through a portion of the vehicle wheel at which an external peripheral portion of a spoke of the vehicle wheel and an external end portion of a rim of the vehicle wheel are connected to each other,
   wherein the first end portion of the connecting pipe is integrally coupled to the vehicle wheel cap, and
   wherein the second end portion of the connecting pipe is exposed to the cavity through the fitting hole formed through the spoke and the rim when the vehicle wheel cap is mounted on the vehicle wheel from an outside of the vehicle wheel.

2. The Helmholtz resonator apparatus for the vehicle wheel according to claim 1, further including:
   a coupling member positioned in the cavity and coupled to the second end portion of the connecting pipe in the cavity, to prevent the vehicle wheel cap from being separated from the vehicle wheel.

3. The Helmholtz resonator apparatus for the vehicle wheel according to claim 1,
   wherein a first threaded portion is provided on an external peripheral surface of the second end portion of the connecting pipe.

4. The Helmholtz resonator apparatus for the vehicle wheel according to claim 3,
   wherein the coupling member includes a second threaded portion on an inner circumference of the coupling member which is engaged with the first threaded portion of the connecting pipe to maintain airtightness between the coupling member and the connecting pipe.

5. The Helmholtz resonator apparatus for the vehicle wheel according to claim 1,
   wherein the vehicle wheel cap is mounted on the spoke of the vehicle wheel, from an outside of the vehicle wheel.

6. The Helmholtz resonator apparatus for the vehicle wheel according to claim 4,
   wherein, when the coupling member is engaged with the first threaded portion of the connecting pipe, the coupling member is brought into contact with the rim of the vehicle wheel and is held in a position on the rim in the cavity.

* * * * *